United States Patent [19]

Zodrow et al.

[11] 4,118,269

[45] Oct. 3, 1978

[54] LABELING STATION

[75] Inventors: Rudolf Zodrow, Düsseldorf; Egon Höveler, Haan, both of Germany

[73] Assignee: Jagenberg-Werke AG, Düsseldorf, Germany

[21] Appl. No.: 843,097

[22] Filed: Oct. 17, 1977

[30] Foreign Application Priority Data

Oct. 18, 1976 [DE] Fed. Rep. of Germany ....... 2646942

[51] Int. Cl.[2] .......................... B32B 31/00; B65C 9/08

[52] U.S. Cl. ..................................... 156/560; 156/571

[58] Field of Search ................................ 156/560, 571

[56] References Cited

U.S. PATENT DOCUMENTS

| | | | |
|---|---|---|---|
| 3,200,027 | 8/1965 | Fairest | 156/571 |
| 3,865,671 | 2/1975 | Kronsder | 156/560 |
| 3,871,943 | 3/1975 | Zodrow | 156/560 |

FOREIGN PATENT DOCUMENTS

| | | | |
|---|---|---|---|
| 1,075,552 | 7/1967 | United Kingdom | 156/571 |

*Primary Examiner*—Douglas J. Drummond

*Attorney, Agent, or Firm*—Burgess, Dinklage & Sprung

[57] ABSTRACT

In a labeling station for applying labels one above the other onto objects, having at least one pickup element mounted essentially on a rotatable carrier for movement about an axis a gripper cylinder is provided having a rotating carrier having eccentrically disposed gripping and pressing elements for the upper and lower labels, which elements are tangent to the circulation path of the pickup elements approximately in synchronism. The labels are transferred by the gripping and pressing elements to objects moved along a transport path whose areas to be labeled are at different distances from the gripper cylinder axis. The carrier of the gripping and pressing elements comprises two parts disposed one over the other and eccentrically to one another, which carry upper and lower gripping and pressing elements at different radii and revolve at equal angular velocity. The circulation paths for the upper and lower gripping and pressing elements have in the labeling range a distance from one another which corresponds to the difference between the areas to be labeled on the objects.

3 Claims, 7 Drawing Figures

LABELING STATION

BACKGROUND OF THE INVENTION

The invention concerns a labeling station having at least one pickup element mounted for rotation or swinging movement, especially in the case of an eccentric arrangement, on a rotating carrier, for labels to be applied one over the other to objects, and having a gripper cylinder which bears on a rotating carrier eccentrically disposed gripping and pressing elements for the upper and lower labels, which elements are tangent to the path of rotation of the pickup elements approximately in synchronism, the said labels being transfered by the gripping and pressing elements to objects moved along a transport path, whose areas to be labeled are at different distances from the gripper cylinder axis.

In one known labeling station of this kind, the gripping and pressing elements revolve on the same circular path. This complies with the requirement that, in the removal of the upper and lower labels from the pickup elements constructed as glue palettes, for example, there must be synchronism between the upper and lower gripping elements. The transfer of the labels to the objects, e.g., to bottles, offers no difficulty as regards the belly label, since the circular path of the gripping and pressing elements and the path of movement of the bottle belly can be brought into the desired spatial relationship and the path speeds of the bottle belly can be adapted to that of the associated pressing elements to one another. The labeling of the neck of the bottle, however, presents difficulties insofar as it is necessary to bridge the distance between the path of circulation of the gripping and pressing elements and the area of the bottleneck that is to be labeled.

This difficulty is overcome in the known labeling station by advancing the pressing element radially pulsewise, in transfering the label to the bottleneck. The disadvantage of this is not only that an advancing means must be provided for each pressing element, but also the path speed of the bottleneck differs greatly from the path speed of the advanced pressing element. This difference is due to the fact that the area of the bottleneck to which the label is to be applied moves on a path that is convexly curved in relation to the gripper cylinder, the radius of curvature of said path being smaller than that of the belly of the bottle. If the angular velocities are equal, the path speed of the bottleneck is accordingly lower than that of the belly of the bottle for which synchronism with the corresponding pressing element exists. Furthermore, the difference in the path speed is due to the fact that the pressing element is brought by the advancement onto a path having a greater radius of curvature. A greater radius of curvature, however, means a higher path speed at the same angular velocity. The deviation from the desired synchronism due to this last reason is especially great, because the radius of curvature of the advanced pressing element is doubled for the rotatory speed (German Pat. No. 2,035,477).

SUMMARY OF THE INVENTION

The invention is addressed to the problem of creating a labeling station whose gripper cylinder makes possible, by simpler means, the simultaneous transfer of a plurality of labels to object surfaces disposed at different distances from the gripper cylinder.

This problem is solved in accordance with the invention, in a labeling station of the initially named kind, in that the carrier of the gripping and pressing elements consists of two parts revolving at equal angular velocity, disposed one above the other and eccentrically from one another and bearing the upper and lower gripping and pressing elements at different radii, the paths of rotation of the upper and lower gripping and pressing elements being at a distance apart which corresponds to that of the areas to be labeled on the objects.

The distance between the label areas on the objects and the gripper cylinder axis is spanned by the eccentricity of the two gripper cylinder parts, so that an advancing means no longer has to be associated with each pressing element. In comparison with the known labeling station, in the case, for example, of synchronism between the belly of the bottle and its associated pressing element, the difference in the path speed between the bottle neck and its associated pressing elements in relation to the above-described, known labeling station, is substantially reduced in the area of action, since the difference between the diameters of the circulation paths, not the difference between the radii, enters into the spanning of the distance between the label areas of the object.

In one embodiment of the invention, in addition to synchronism between the upper and lower pressing elements and their corresponding label areas, synchronism can also be achieved between the upper and lower pressing elements and their corresponding label areas by disposing the upper and lower gripping elements and the upper and lower pressing elements, respectively, on separate carrier parts disposed one above the other and eccentrically to one another and rotating at equal angular velocity, the circulation path of the pressing elements being offset eccentrically from the circulation path of the gripping elements tangent to the circulation path of the pickup elements, such that it is tangent to the path of movement of the label areas and has a radius at which the path speeds of the pressing elements and of the label areas are equal within the labeling range.

With this embodiment of the invention, it is brought about that the gripping elements pick up the labels in synchronism with the pickup elements and tangentially thereto, and they bring the labels as close as possible to the areas to which they are to be applied and which are situated at different distances from the gripper cylinder axis. In addition, it is brought about that synchronism with the label areas both for the pressing elements of the lower labels and for those of the upper labels. Thus all requirements for an optimum labeling are fulfilled.

The eccentric offsetting and the driving of the gripping and pressing elements can be accomplished in accordance with the invention by mounting an adjustable eccentric on the central drive shaft of the one carrier part, for corotation therewith, the other carrier part being mounted on this eccentric, the two parts being coupled together in the manner of a double crank, especially through links. This eccentric mounting and drive principle can be applied both between the upper carrier part and the lower carrier part as well as within one carrier part, i.e., between the part carrying the gripping elements and the part carrying the pressing elements.

BRIEF DESCRIPTION OF THE DRAWINGS

The invention is further explained hereinafter with the aid of a drawing representing an example of its embodiment. Specifically.

DETAILED DESCRIPTION OF THE INVENTION

Figure 1:
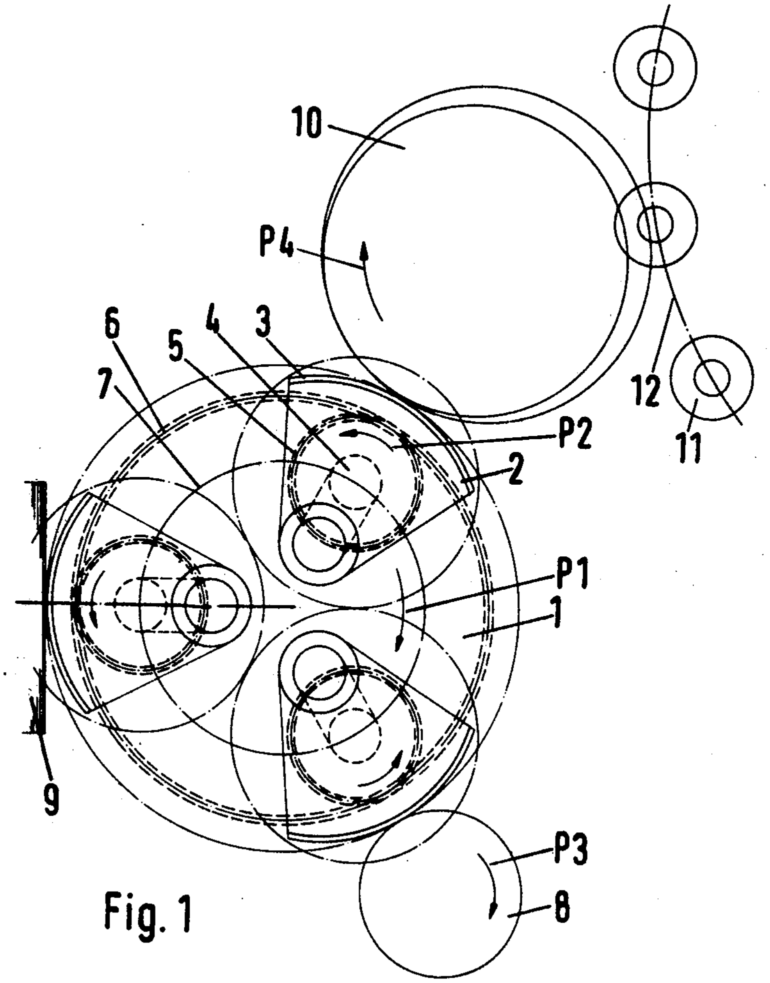
FIG. 1 is a diagrammatic top plan view of a labeling station.

In the labeling station represented in the drawing three pickup elements 2 are eccentrically arrayed on a carrier 1 rotating at constant angular velocity in the direction of the arrow $P_1$. Each pickup element 2 rotates in the direction of arrow $P_2$ about a drive shaft 4 situated between its convexly curved pickup face 3 and the corresponding center of curvature. On the drive shaft 4 is situated a planet gear 5 which meshes with a stationary sun gear 6. In the case of a revolving carrier 1, the pickup elements are moved along a circular path 7 with simultaneous self-rotation past various stations, namely a glue roll 8 rotating in the direction of the arrow $P_3$, a stationary label stack 9, and a gripper cylinder 10 rotating in the direction of the arrow $P_4$. To enable the pickup face 3 of the pickup elements 2 to roll against the differently curved surfaces of stations 8, 9 and 10, a cam-controlled drive, which is not shown, is associated with each pickup element 2.

The pickup faces 3 smeared with glue at the glue roll 8, upon rolling against the flat front of the label stack 9, pick up the topmost label by adhesive action, and bring it into the range of the gripper cylinder 10. The latter pulls the label by means of gripping elements away from the pickup face and transfers it to objects, e.g., bottles 11, which are moved past the gripper cylinder 10 on a path 12 which is convexly curved with respect to the gripper cylinder 10.

The labeling station as described thus far is known (German Offenlegungsschrift No. 2,325,244).

Figure 2:
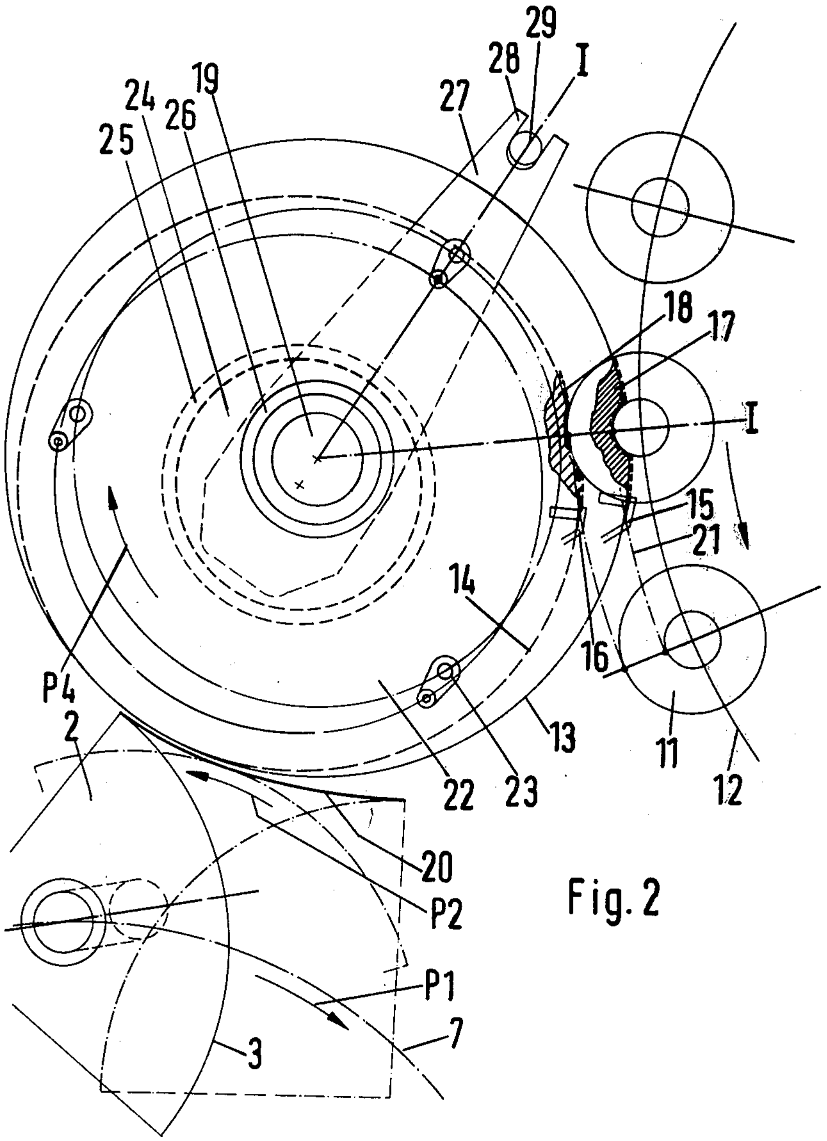
FIG. 2 is a top plan view of the gripper cylinder of the labeling station of FIG. 1.
Figure 3:
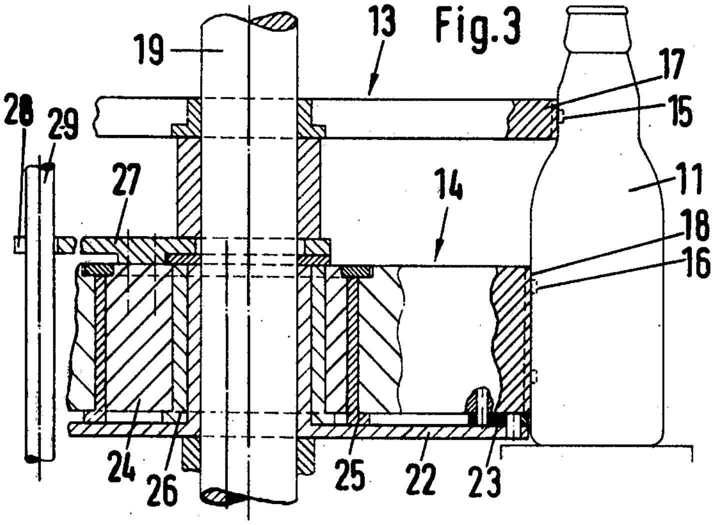
FIG. 3 is an axial cross section taken along line I — I of FIG. 2, of the gripper cylinder of the labeling station of FIG. 1.

The gripper cylinder in accordance with the embodiment represented in FIGS. 2 and 3 consists of two parts 13 and 14 which are disposed one over the other and bear on their circumference gripping elements 15 and 16 and pressing elements 17 and 18. The pressing elements 17 and 18 consist of soft pads which can conform to the shape of the objects 11, as represented in FIG. 2. The construction of the gripping and pressing elements 15 to 18 and the controlling of the gripping elements 15 and 16 is known in itself.

The upper gripper cylinder part 13 associated with the breast or neck of the bottle, as the case may be, has a larger diameter than the lower gripper cylinder part 14 associated with the belly of the bottle and is fastened concentrically to a drive shaft 19 for corotation therewith. The position of the gripper cylinder part 13 is such that the gripping elements 15 disposed on its circumference are on the one hand tangent to the circulation path 20 of the pickup elements 2, representing a roll path, and on the other hand tangent to or slightly crossing the path of movement 21 of the area of the bottle neck that is to be labeled, as it can be seen in FIG. 2. The rotatory speed of the drive shaft 19 and thus the circumferential speed of the gripper cylinder part 13 is coordinated with the path speed of the pickup elements in the direction of arrow $P_2$ such that the gripper elements are able to take the corresponding label from the pickup element in approximate synchronism and do not have to pull it off in the direction of the pickup surfaces 3. The action of the taking of the labels by the labeling cylinder part 13 is represented by solid lines in FIGS. 6 and 7.

On the drive shaft 19 there is affixed for corotation therewith a drive plate 22 by which the other gripper cylinder part 14 is driven. The drive plate 22 is connected with the gripper cylinder part 14 through a plurality of links 23 distributed over the circumference, whose pivot points are situated in the drive plate 22 and in the gripper cylinder part 14 on circles which are of the same size but are situated eccentrically from one another.

The gripper cylinder part 14 is mounted eccentrically on the drive shaft 19 by means of an eccentric 24, and thus also eccentrically with respect to the gripper cylinder part 13. Between the drive shaft 19 and the eccentric 24 on the one hand and the eccentric 24 and the gripper cylinder part 14 on the other there is provided, in each case, a bearing 25, 26. The eccentric 24 is held by a lever arm 27 against rotation. The free end of the lever arm 27 has a fork 28 straddling a stationary rod 29.

As it can be seen in FIG. 2, since the two gripper cylinder parts 13 and 14 are of different diameter, the position of the eccentric 24 and its eccentricity are such that, in the area in which the labels are taken from the pickup elements 2, the circulation paths of the gripping and pressing elements 15 to 18, which in the diagrammatic representation coincide with the outer circumference of the two gripper cylinder parts 13 and 14, are tangent in a certain area to the roll path 20 of the pickup elements and are offset in the labeling range by the distance between the areas of the bottle neck and bottle belly to which the labels are to be applied.

Figure 6:
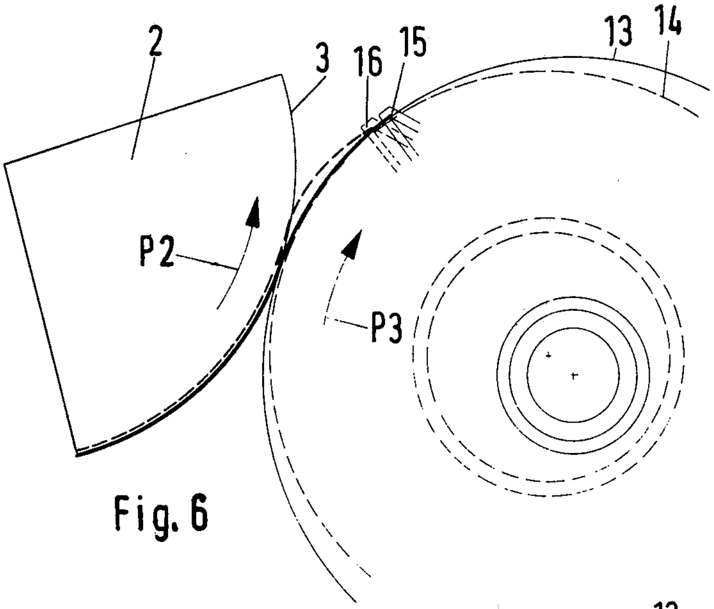
Figure 7:
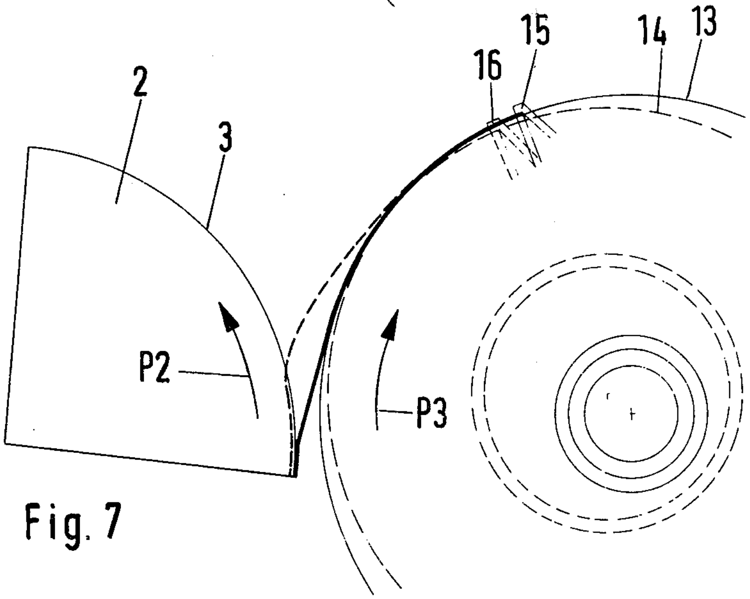

Since, in the case of equal angular velocity of the two gripper cylinder parts 13 and 14, which have the same division, the upper gripper cylinder part 13 for the neck or breast label, as the case may be, has a greater diameter than the other gripper cylinder part 14 and thus rotates at a greater circumferential speed, the label taken by the smaller-diameter gripper cylinder part 14 when the labels are removed from the pickup element 2, will remain adhering slightly longer to the pickup surface 3, as is represented in broken lines in FIGS. 6 and 7. For the handling of the labels, however, this effect is of no importance. It is important only that it be assured by the above-described measures that the seizing of the leading edges of the label by the gripping elements 15 and 16 takes place in the tangent area of the roll path 20.

On account of the eccentric offsetting of the two gripper cylinder parts 13 and 14 and of the driving at equal angular velocity, on the one hand a perfect removal of the label from the pickup elements is assured, and on the other hand the distance between the areas to be labeled is spanned without additional control members for the pressing elements. If synchronism is established between one of the areas to be labeled and the corresponding pressing elements, it is true that there is no synchronism between the other area to be labeled and the associated pressing elements, and yet the difference in this case is not as great as it is in the above-described known labeling station in which the grippers are concentrically disposed, because in the case of the invention the offsetting of the two gripper cylinder parts and hence of their diameters enters into the spanning of the distance of the areas to be labeled, not just the radius.

Figure 5:
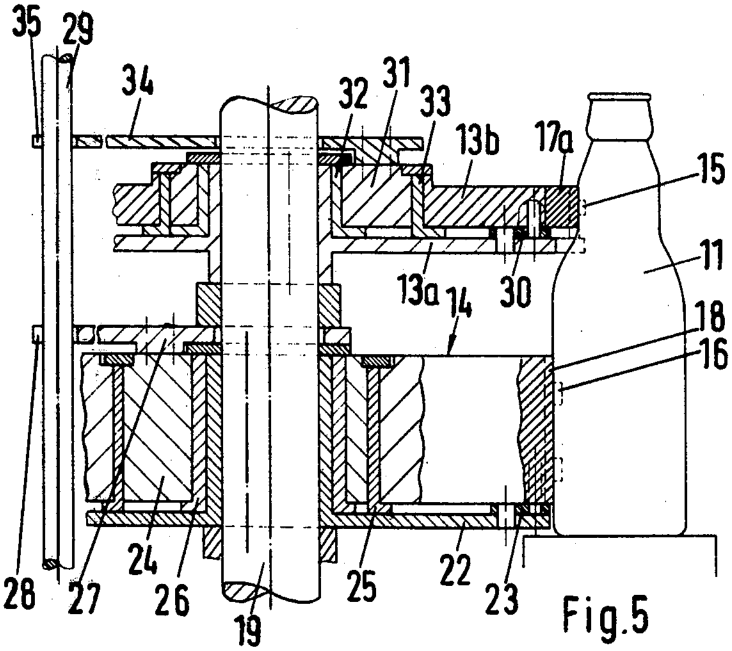
FIG. 5 shows the gripper cylinder of the labeling station of FIG. 1 in an axial cross section taken along line II — II of FIG. 4, and FIGS. 6 and 7 show two phases in the removal of the labels by the gripper cylinder from the pickup elements.
Figure 4:
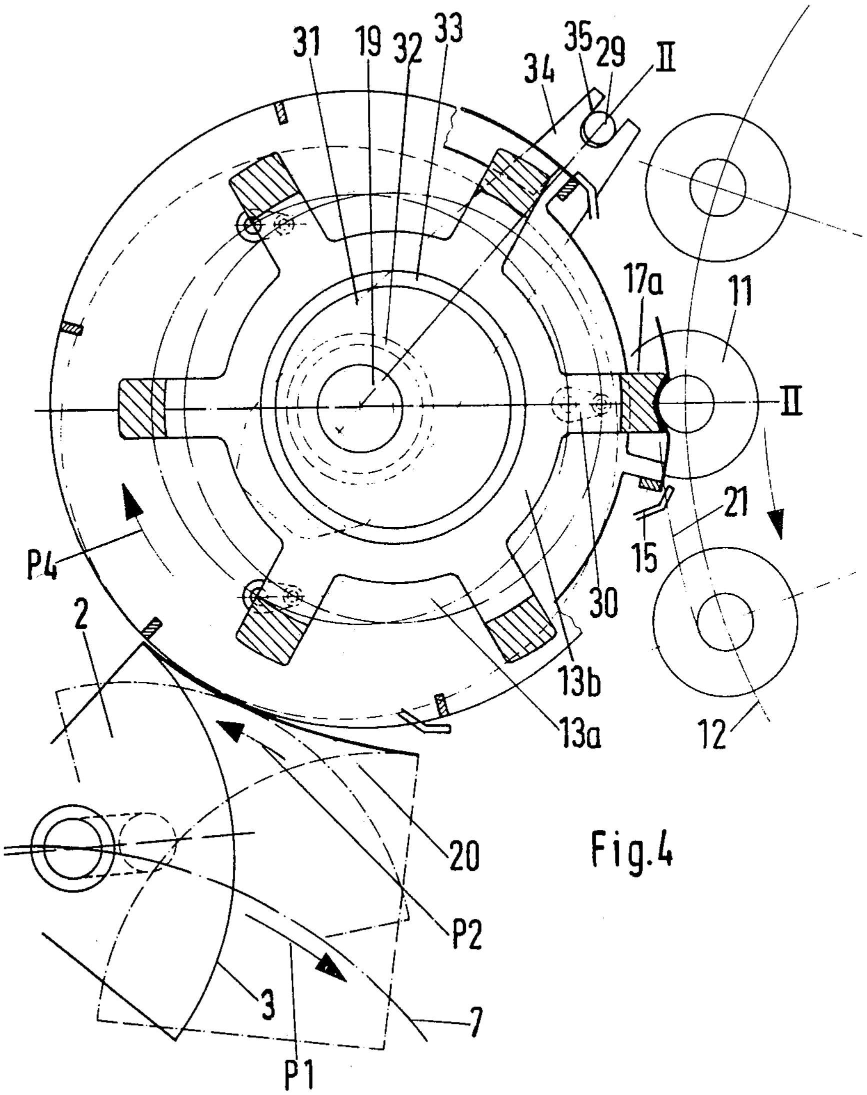
FIG. 4 is a top plan view of the gripper cylinder of FIG. 1 in an embodiment that is a modification of the one in FIGS. 2 and 3.

However, if it is still desired to have synchronism between the second area to be labeled—the bottleneck in this case—and its associated pressing elements, the upper gripper cylinder part 13 can also be divided, in accordance with the further development represented in FIGS. 4 and 5; in this case the part bearing the pressing elements is offset eccentrically from the concentrically disposed part carrying the gripping elements. In this design, the one part 13*a* carrying the gripping elements 15 serves as a drive plate to which the other part 13*b* carrying the pressing elements 17*a* is coupled by a plurality of links 30 which are distributed about the circumference. The pivot points in parts 13*a* and 13*b* are disposed on circles which are of equal size but are eccentric from one another. Part 13*b* is mounted rotatably in relation to the drive shaft on an eccentric 31, a bearing 32 or 33 being provided between the eccentric 31 and the drive shaft 19, on the one hand, and the eccentric 31 and part 13*b* on the other. The eccentric 31 is held against rotation by a lever arm 34. A fork 35 at the free end of the lever arm 34 straddles the stationary rod 29. If the eccentric 31 is to be adjusted independently of the eccentric 24, another rod must, of course, be provided, or the eccentric 31 must be adjustable in relation to the lever arm 34.

The radius of the circulation path of the pressing elements 17*a* is selected in consideration of the angular velocity and the path speed of the label areas of the bottleneck, so that, when the labels are pressed against the bottleneck there will be synchronism between the pressing elements and the bottleneck. The size and the position of the eccentric are so defined that the pressing elements 17*a* can contact the label area.

As it can be seen in FIG. 4, the grippers 15 of part 13*a* on the one hand are tangent to the roll path 20 of the pickup elements, and on the other hand they bring the labels into the vicinity of the bottleneck label area, i.e., into the optimum position for the pressing operation. Since the path speed of the gripping elements 15 is greater than the path speed of the corresponding label areas and thus is greater than that of the pressing elements 17*a*, the gripping element 15 must open at the moment the pressing element goes into operation, so that the label from there on will be only under the action of the pressing element. The means for bringing about the opening of the gripping elements 15 are known in themselves.

In the embodiment represented in FIGS. 4 and 5, which is an improvement on the one shown in FIGS. 2 and 3, a perfect removal of the labels from the pickup elements takes place, the labels are brought by the gripping elements to the optimum position for pressing onto the objects, and, finally, the pressing of the labels on the objects is performed with synchronism.

It will be appreciated that the instant specification and examples are set forth by way of illustration and not limitation, and that various modifications and changes may be made without departing from the spirit and scope of the present invention.

What is claimed is:

1. In a labeling station for applying labels one above the other onto objects, having at least one pickup element mounted eccentrically on a rotatable carrier for movement about an axis, wherein the improvement comprises a gripper cylinder comprising a rotating carrier having eccentrically disposed gripping and pressing elements for the upper and lower labels, which elements are tangent to the circulation path of the pickup elements approximately in synchronism, the labels being transferred by the gripping and pressing elements to objects moved along a transport path, whose areas to be labeled are at different distances from the gripper cylinder axis, wherein the carrier of the gripping and pressing elements comprises two parts disposed one over the other and eccentrically to one another which carry upper and lower gripping and pressing elements at different radii and revolve at equal angular velocity and wherein circulation paths for the upper and lower gripping and pressing elements have, in the labeling range, a distance from one another which corresponds to the difference between the areas to be labeled on the objects.

2. The labeling station of claim 1, further comprising means for synchronizing the lower and upper pressing elements and the respective areas to be labeled comprising disposing the upper and lower gripping elements and the upper and lower pressing elements on separate carrier parts disposed one over the other and eccentrically to one another and revolving at equal angular velocity, the circulation path of the pressing elements being eccentrically offset with respect to the circulation path of the gripping elements which is tangent to the circulation path of the pickup elements, such that it is tangent to the movement path of the areas to be labeled and has a radius at which the path speeds of the pressing elements and of the areas to be labeled are equal within the labeling range.

3. The labeling station of claim 1, further comprising a central drive shaft of the one carrier part, an eccentric seated on the drive shaft and on which the other carrier part is mounted means coupling the two parts together in the manner of a double crank, comprising links.

* * * * *